(12) United States Patent
Holung et al.

(10) Patent No.: US 9,413,031 B2
(45) Date of Patent: Aug. 9, 2016

(54) APPARATUS AND SYSTEM FOR AN INTERNAL FUSE IN A BATTERY CELL

(75) Inventors: Joseph Anthony Holung, Wake Forest, NC (US); Tin-Lup Wong, Chapel Hill, NC (US); Bouziane Yebka, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 915 days.

(21) Appl. No.: 12/410,132

(22) Filed: Mar. 24, 2009

(65) Prior Publication Data

US 2010/0247987 A1  Sep. 30, 2010

(51) Int. Cl.
*H01M 10/052* (2010.01)
*H01M 10/42* (2006.01)
*H02J 7/00* (2006.01)

(52) U.S. Cl.
CPC ........ *H01M 10/052* (2013.01); *H01M 10/4235* (2013.01); *H01M 2200/106* (2013.01); *H02J 7/0031* (2013.01); *Y02E 60/122* (2013.01); *Y02T 10/7011* (2013.01)

(58) Field of Classification Search
CPC  H01M 2/345;  H01M 2200/20;  H01M 10/445
See application file for complete search history.

(56) References Cited

U.S. PATENT DOCUMENTS

| | | | | |
|---|---|---|---|---|
| 4,188,460 A * | 2/1980 | Kang et al. | | 429/7 |
| 5,415,948 A * | 5/1995 | Gauthier et al. | | 429/62 |
| 6,235,426 B1 * | 5/2001 | Yanai et al. | | 429/211 |
| 6,727,021 B1 * | 4/2004 | Shiota et al. | | 429/232 |
| 2001/0005562 A1 * | 6/2001 | Yoshioka et al. | | 429/185 |
| 2001/0018147 A1 * | 8/2001 | Yanai et al. | | 429/62 |
| 2003/0129478 A1 * | 7/2003 | Nishimura et al. | | 429/62 |
| 2004/0135545 A1 * | 7/2004 | Fowler et al. | | 320/118 |

FOREIGN PATENT DOCUMENTS

JP  10241737 A  * 9/1998

* cited by examiner

*Primary Examiner* — Maria J Laios
*Assistant Examiner* — Robert S Carrico
(74) *Attorney, Agent, or Firm* — Kunzler Law Group (57) ABSTRACT

A battery is disclosed for reducing the severity of thermal runaway. The battery includes an anode sheet, a cathode sheet, and a separator situated between the anode sheet and the cathode sheet. The anode sheet, cathode sheet, and separator may be put together in a jelly roll configuration. The battery also includes internal fuses that subdivide the anode sheet, cathode sheet, or both, into electrically separate areas. The fuses are activated during thermal runaway and isolate separate areas of the sheet, thus reducing the total energy available during thermal runaway and reducing the severity. The fuses may be positive temperature coefficient (PTC) fuses that conduct current at normal operating temperatures but stop conducting current at temperatures above normal operating temperatures. The fuses may be placed in the current collectors, or directly into the anode sheet and cathode sheet themselves. In certain embodiments, the fuses may stop conducting when they reach a predefined threshold temperature or when an excessively large current passes through the fuses.

14 Claims, 8 Drawing Sheets

APPARATUS AND SYSTEM FOR AN INTERNAL FUSE IN A BATTERY CELL

FIELD

This invention relates to an improved battery, and particularly to the use of an internal fuse within individual cells of a battery.

BACKGROUND

Description of the Related Art

Batteries are omnipresent in consumer electronics, providing power in the ubiquitous laptops, cell phones, PDAs, and other electronics currently on the market. For example, it is estimated that there are over 1.8 billion lithium ion cells in circulation. Lithium ion batteries, with their high energy density, ability to hold a charge, and freedom from memory effects, are the dominant battery type in various industries.

As the demands on electronics grows, so to do the demands on the batteries powering them. However, as batteries grow in capacity, risks associated with that increased energy capacity grow as well. One risk that has received considerable attention is the possibility of an explosion or fire when a battery fails. For example, an internal short in one of the cells of a lithium ion battery may result in thermal runaway. Thermal runaway refers to a situation where an increase in temperature causes a change conditions that facilitates further increases in temperature. This, of course, results in a feedback loop of increasing temperature and leading to the ultimate destruction of the battery.

In those rare but well-documented cases of thermal runaway, thermal runaway generally results in fire. When the lithium ion battery is in thermal runaway, high pressure materials can escape, catch fire, and burn at a relatively high temperature. Such a failure in one cell may well trigger a similar failure in adjacent cells, causing additional fire or explosions. And while failures in lithium ion batteries are well documented, incidents of thermal runaway are not limited to lithium ion batteries. As the energy supplied by batteries grows, so does the potential for harmful and destructive failures.

SUMMARY

Described herein is a battery that comprises an anode sheet, a cathode sheet, and a separator that is situated between the anode sheet and the cathode sheet and electrically separates the two sheets. The battery may be, for example, a lithium ion battery, a nickel cadmium battery, or some other type of battery. The battery also includes an internal fuse. The fuse may be positioned in the anode sheet, the cathode sheet, or there may be fuses in both. If the fuse is in the anode sheet, it divides the anode sheet into separate areas and electrically isolates one or more of these separate areas during thermal runaway. If the fuse is in the cathode sheet, it similarly divides the cathode sheet into separate areas and electrically isolates one or more of the separate areas during thermal runaway.

In certain embodiments, the fuse electrically isolates the separate areas once the fuse reaches a predefined threshold temperature. In particular embodiments, the predefined threshold temperature is between 135° C. and 140° C. In certain embodiments, the fuse may conduct electricity at temperatures below the predefined threshold temperature and stop conducting electricity at temperatures at or above the predefined threshold temperature. In one embodiment, the fuse is a positive temperature coefficient (PTC) fuse.

The battery may also include additional fuses that divide the anode sheet into separate areas that are electrically isolated by the additional fuses during thermal runaway. The battery may similarly include additional fuses that divide the cathode sheet into separate areas that are electrically isolated by the additional fuses during thermal runaway.

In certain embodiments, the anode sheet and the cathode sheet are coated with heat resistant layers. The separator may similarly be coated with a heat resistant layer. The battery may also have the anode sheet, cathode sheet, and separator in a jelly roll configuration.

The battery may also include an anode current collector that connects the anode sheet to an anode of the battery and a cathode current collector that connects the cathode sheet to a cathode of the battery. In certain embodiments, the anode current collector may be divided into two and is electrically connected by the fuse such that the anode sheet is divided into two separate areas. Similarly, in certain embodiments, the cathode current collector is divided into two, and the two separate pieces are connected by a fuse such that the cathode sheet is divided into two separate areas.

In certain embodiments the battery includes a plurality of battery cells, and each battery cell includes an anode sheet, a cathode sheet, a separator, and a fuse internal to the cell. The fuse may divide the anode sheet into two separate areas and electrically isolate those two separate areas of the anode sheet when the fuse reaches a predefined temperature. The cathode sheet may be similarly divided by a fuse. The battery cells may also include additional fuses in addition to the fuse dividing the anode sheet or cathode sheet into two separate areas. In certain embodiments, each cell has a first fuse that divides the anode sheet into two separate areas and a second fuse that divides the cathode sheet into two separate areas. This particular embodiment may also have additional fuses that further divide either the anode sheet, the cathode sheet, or both sheets.

In one embodiment, the battery is a lithium ion battery that includes a control module that manages the charging and discharging process of the lithium ion battery. The lithium ion battery includes a plurality of lithium ion battery cells. In one embodiment, each cell includes an anode sheet, a cathode sheet, an anode current collector that electrically connects the anode sheet to an anode of the lithium ion battery and that is divided into two pieces, and a cathode current collector that electrically connects the cathode sheet to a cathode of the lithium ion battery that is separated into two pieces. In such an embodiment, each cell may also include a separator situated between the anode sheet and the cathode sheet that electrically separates the two while allowing ions to pass between the anode sheet and the cathode sheet.

Each cell may also include a fuse that joins the first piece of the anode current collector with the second piece of the anode current collector. The fuse increases in resistant and substantially stops current from passing through the first fuse when the first fuse reaches a temperature of between 135° C. and 140° C. A second fuse may join the first piece of the cathode current collector with the second piece of the cathode current collector. The second fuse increases in resistance and substantially stops current from passing through the second fuse when it reaches a temperature of between 135° C. and 140° C.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2, made up of FIGS. 2a and 2b, is a schematic block diagram illustrating configurations of components of a battery cell incorporating internal fuses;

FIG. 4, made up of FIGS. 4a and 4b, is a schematic block diagram illustrating embodiments of an cathode sheet incorporating a fuse;

FIG. 6, made up of FIGS. 6a, 6b, and 6c, is a schematic block diagram illustrating various configurations for incorporating an internal fuse into a current collector of a battery cell;

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
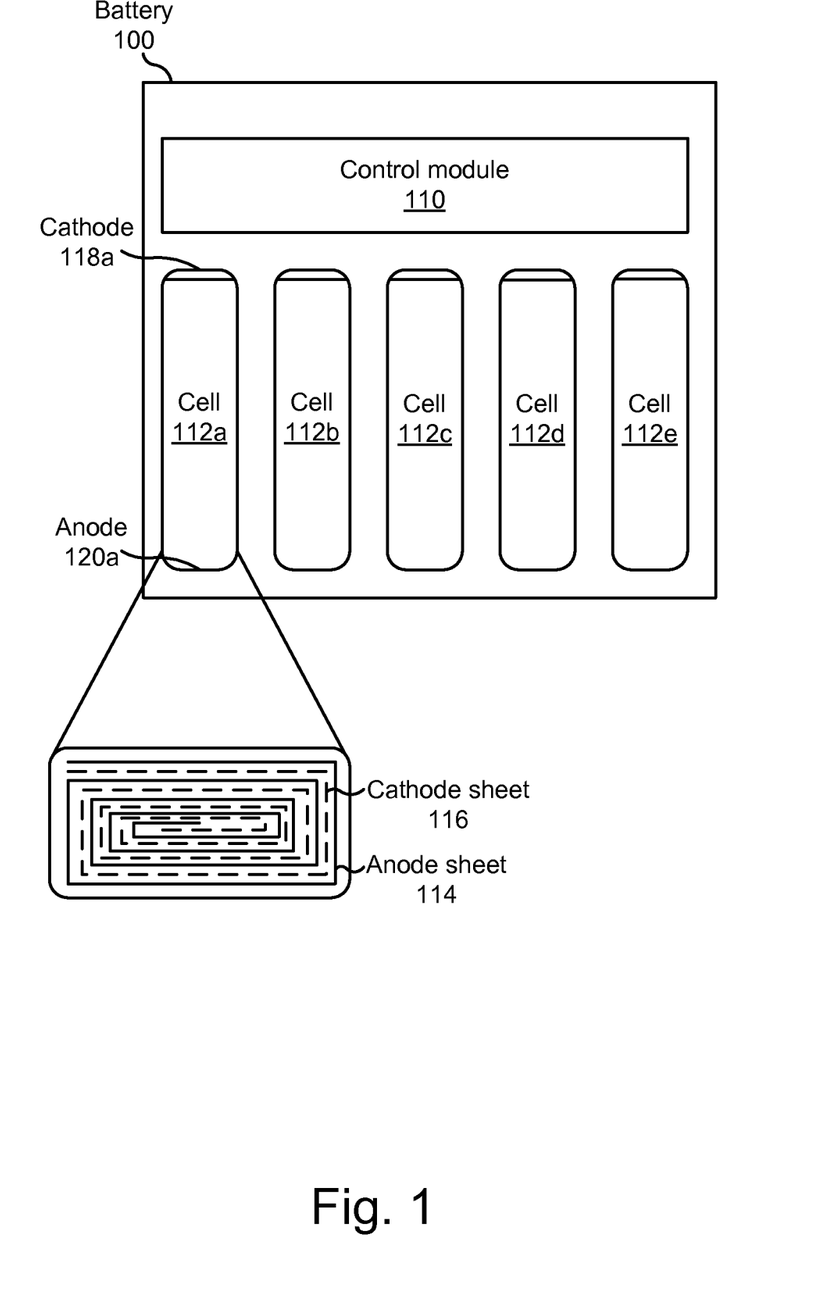
FIG. 1 is a schematic block diagram illustrating one embodiment a battery having cells with internal fuses.

FIG. 1 illustrates one embodiment of a battery 100. The battery may be a multi-cell battery 100, such as a lithium ion battery or a nickel cadmium battery, or a single cell battery 100. While the depicted embodiment shows a multi-cell battery 100, the battery 100 is not limited to such an embodiment. The battery 100 provides power to an electronic device that requires electrical energy for operation. The electronic device may be a computer, a cell phone, a personal digital assistant, a vehicle such as a car, boat, or an airplane, or other device that requires electrical energy. In typical embodiments, the battery 100 allows the electronic device to be operated away from an immediate power supply such as an electrical socket.

In the depicted embodiment, the battery 100 includes a control module 110 and cells 112a-e. The control module 110 may not be necessary for the battery 100 in certain embodiments. In other embodiments, the control module 110 may be external to the battery 100. For example, a rechargeable battery may have a charging device that includes a control module 110. The control module 110 includes hardware and may also contain software for performing various management tasks in the battery 100. For example, the control module 110 may include temperature sensors that monitor battery 100 temperature, a voltage converter and regulator circuit to control voltage and current levels, a voltage tap for monitoring the energy capacity of the cells 112a-e, and a battery charge state monitor that manages aspects of the charging and discharging process.

The cells 112a-e include the elements that produce the electrical energy supplied by the battery 100. The cells 112a-e include a cathode sheet 116 (also commonly referred to as a positive electrode) and an anode sheet 114 (also commonly referred to as a negative electrode) that are separated by a separator (shown in FIG. 2). In certain embodiments, such as that shown in FIG. 1, the cathode sheet 116, anode sheet 114, and separator are rolled together in what is called a jelly roll. The shape of the cells 112a-e are typically cylindrical or rectangular in a jelly roll configuration. The cells 112a-e also typically include an electrolyte—for example, an alkaline electrolyte such as potassium hydroxide is typical in nickel cadmium batteries, while the electrolyte in a lithium ion battery may be an organic solvent containing lithium salts such as $LiPF_6$.

The cathode sheet 116 is electrically connected to the cathode 118a of the cell 112a while the anode sheet 114 is electrically connected to the anode 120a of the cell 112a. The anode 120a is often the steel can encasing the cell 112a-e. In certain embodiments, the cathode sheet 116 and the anode sheet 114 each include a current collector (shown in FIG. 2) that collects the charge generated during discharge of the battery 100 and that permit recharging the battery 100 when it is connected to a power source. The cells 112a-e also include internal fuses that are activated in the individual cells 112*a-e* when the particular cell 112*a-e* containing the fuse begins to enter thermal runaway.

Figure 2A:
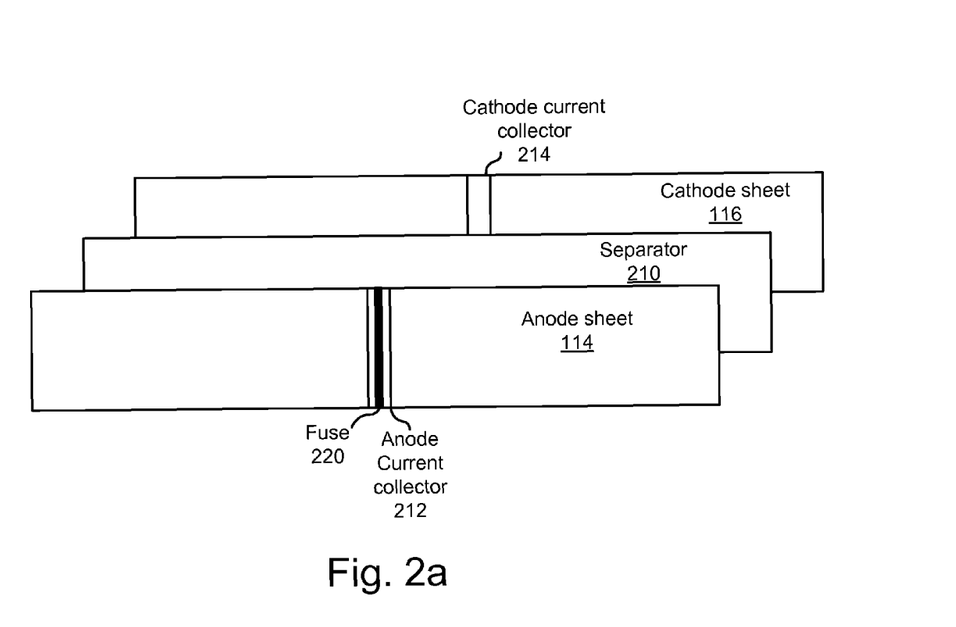

FIG. 2 shows more detail of particular embodiments of a jelly roll in a cell 112*a-e* and of particular embodiments of a sheet within the jelly roll. FIG. 2*a* shows a cathode sheet 116 with a cathode current collector 214, a separator 210, and an anode sheet 114 with an anode current collector 212. In certain embodiments, the cathode current collector 214 is located in the center of the cathode sheet 116. In other embodiments, the cathode current collector 214 is located at the sides of the cathode sheet 116.

In a lithium ion battery, the cathode sheet 116 may be made of $LiCoO_2$, $LiMnO_2$, $LiFePO_4$, $Li_2FePO_4F$, or other suitable material. The anode sheet 114 may be made of carbon or other suitable material. The materials used for the cathode sheet 116 and anode sheet 114 will naturally vary based on the type of battery, whether lithium ion, nickel cadmium, or other.

The separator 210 is a layer situated between the anode sheet 114 and the cathode sheet 116 that electrically separates the anode sheet 114 and the cathode sheet 116 while permitting materials necessary to generate electrical energy to pass through. For example, in a lithium ion battery, the separator allows ions to pass between the anode sheet 114 and the cathode sheet 116. The separator 210 may be a perforated material, microporous material, or other configuration of a suitable material such as an organic polymer.

The anode current collector 212 and the cathode current collector 214 may be made of copper foil, aluminum, or other suitable material. The cathode sheet 116, anode sheet 114, and separator 210 are often rolled together in a jelly roll configuration as shown in FIG. 1 and placed into the particular cell. The jelly roll may include additional separators 210; for example, a second separator sheet may be inserted prior to rolling the materials into a jelly roll.

The anode sheet 114 and the cathode sheet 116 may also be coated with a heat resistant layer (HRL) that provides extra protection against thermal runaway. In one embodiment, the HRL is a ceramic coating. In certain embodiments, the separator 210 may also have an HRL coating. The HRL coating provides an extra layer of protection against an internal short circuit between the anode sheet 114 and the cathode sheet 116, thus reducing the likelihood of thermal runaway due to a short circuit. However, the HRL coating does not guarantee that thermal runaway will be completely eliminated.

As described in greater detail below, the anode sheet 114 and the cathode sheet 116 may also include fuses 220. In certain embodiments, a fuse 220 may be located in only one of the cathode sheet 116 and the anode sheet 114. In other embodiments, fuses 220 are located in both the cathode sheet 116 and the anode sheet 114. Either sheet may have no fuse 220 or multiple fuses 220, depending on the design requirements. While the following description and figures may show fuses 220 in one or the other of an anode sheet 114 and a cathode sheet 116, the configurations are equally applicable to the other type of sheet.

The fuse 220 is a protective device that divides a sheet (such as the anode sheet 114 shown in FIG. 2*a*) into separate areas and electrically isolates the separate areas during thermal runaway. For example, in FIG. 2*a*, the anode sheet 114 is divided into two separate areas by the fuse 220. While the fuse 220 is depicted as located on the anode current collector 212, the fuse 220 may be located at a variety of positions on the anode sheet 114.

The fuse 220 may electrically isolate the separate areas when certain thermal runaway conditions are present in the cell 112*a-e*. As used herein, thermal runaway conditions are those conditions that are indicative of the particular sheet (in this case the anode sheet 114) entering thermal runaway. Thermal runaway conditions may include temperature, pressure within the cell 112*a-e*, current level, rate of change of the current, or other indicia. The fuse 220 electrically isolates the separate areas of the anode sheet 114 when certain specified thermal runaway conditions are met. The designer of the battery 100 will generally determine at what point to electrically isolate the separate areas. The designer may choose a predefined threshold temperature as the thermal runaway condition. For example, in a lithium ion battery, thermal runaway begins at approximately 135° C. to 140° C. Thus, in one embodiment, the fuse 220 electrically isolates the separate areas of the anode sheet 114 once the fuse 220 reaches approximately 135° C.

A designer may choose a more conservative approach and select a predefined threshold temperature of between 125° C. and 135° C., or a more aggressive approach and select a predefined threshold temperature of between 140° C. and 150° C. Thus, in certain embodiments, the predefined threshold temperature may range between 125° C. and 150° C.

In certain embodiments, the fuse 220 conducts electricity at temperatures below the predefined threshold temperature and does not conduct electricity, or conducts very little at temperatures above the predefined threshold temperature. For example, the fuse 220 may drastically increase its resistance once it reaches the predefined threshold temperature.

In one embodiment, the fuse 220 may be a positive temperature coefficient (PTC) thermistor material whose resistance is proportional to temperature. The fuse 220 may thus be chosen such that the resistance of the fuse 220 rises suddenly at the predefined threshold temperature. In one embodiment, the fuse 220 may be a PTC thermistor that increases in resistance in an amount sufficient to stop, or substantially stop, current flow through the fuse 220 once the fuse 220 reaches a temperature of 135° C. In certain embodiments, the fuse 220 thus increases in resistance and substantially stops current from passing through the fuse 220 when the fuse 220 reaches between 135° C. and 145° C.

The fuse 220 may have a variety of different configurations. In certain embodiments, the fuse 220 may be in a fuse tape form and is used to join separate portions of the anode sheet 114 or cathode sheet 116. The fuse 220 may also be a chemical fuse that is physically part of the anode sheet 114 or cathode sheet 116. In other embodiments, the fuse 220 may be a backing on which the anode sheet 114 or cathode sheet 116 are laid out. Other configurations for the fuse 220 are also available.

Figure 2B:
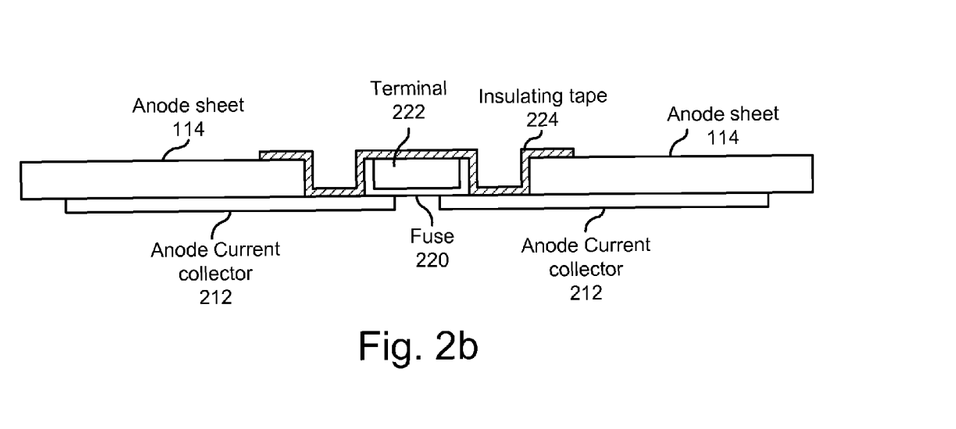

FIG. 2*b* shows one embodiment of an anode sheet 114 having a fuse 220. This configuration may be equally applicable to the cathode sheet 116. In certain embodiments, the anode sheet 114 is segmented into physically separate pieces as depicted in FIG. 2*b*. The anode current collector 212 may also be split into two physically separate pieces as shown in FIG. 2*b*. Also shown in FIG. 2*b* is a terminal 222 connecting the anode current collector 212 to the anode 120*a* of the cell 112*a*. The insulating tape 224 provides insulation and additional structure, and may be a polymer tape such as polyvinyl.

In one embodiment, as shown in FIG. 2*b*, the anode current collector 212 is divided into two separate pieces. The fuse 220 electrically connects the two separate pieces of the anode current collector 212. When the cell 112*a-e* is operating under normal conditions, the fuse 220 conducts current and the anode sheet 114 is electrically a continuous whole. However, during thermal runaway, the fuse 220 stops conducting current and the first piece of the anode sheet 114 is electrically isolated from the second piece. For example, in one embodiment, the fuse 220 is PTC material and increases in resistance once the fuse 220 reaches a predefined threshold temperature, effectively stopping current flow. As a result, the anode sheet 114 is electrically divided into two separate areas when the fuse 220 stops conducting.

If the anode sheet 114 enters thermal runaway, the fuse 220 isolates the separate portions of the anode sheet 114. As a result, the total energy available in the anode sheet 114 is reduced since the anode sheet 114 is compartmentalized during thermal runaway. While the cell 112a-e may still be destroyed by the thermal runaway of the portion of the anode sheet 114, the thermal runaway process may be slowed, and in addition, the temperature of the cell 112a-e and the associated exhaust is lower than that of an undivided cell 112a-e.

Figure 3:
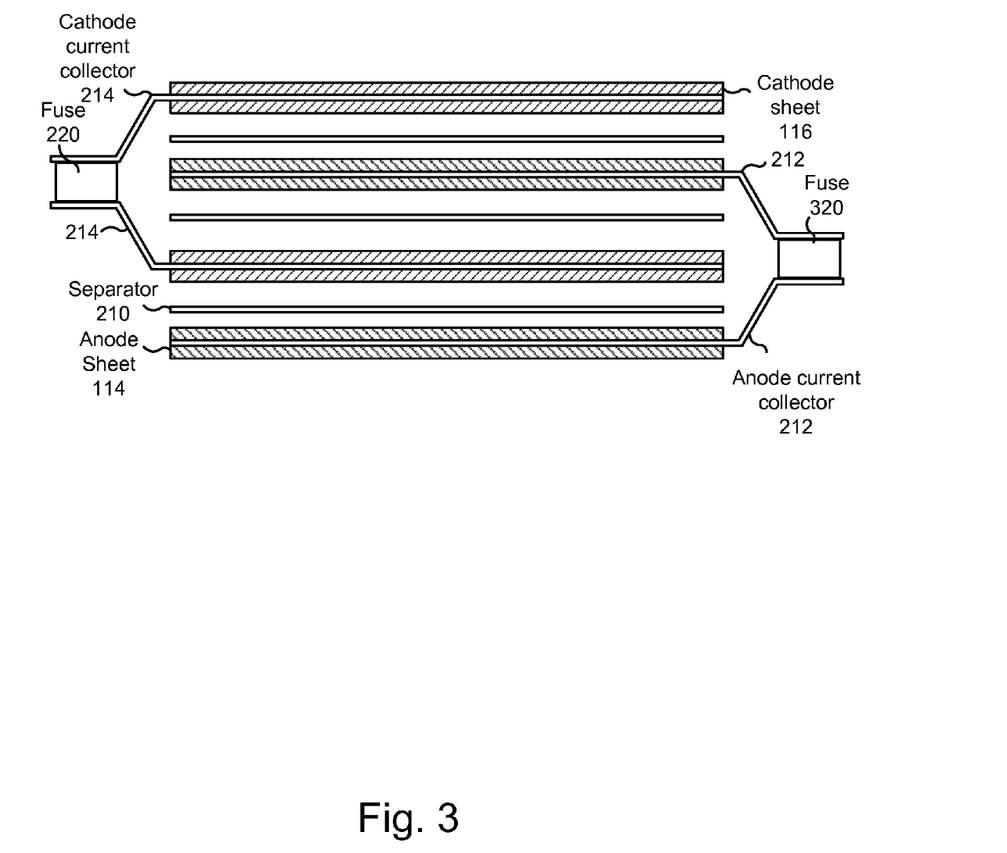
FIG. 3 is a schematic block diagram illustrating one configuration of a battery cell incorporating internal fuses.

FIG. 3 shows an embodiment of a jelly roll in a cell 112a-e incorporating multiple fuses 220 and 320. FIG. 3 shows portions of a cathode sheet 116 having a cathode current collector 214 and an anode sheet 114 having an anode current collector 212. FIG. 3 also shows a separator 210 maintaining separation between the cathode sheets 116 and the anode sheets 114.

A fuse 220 joins the cathode current collector 214 and a fuse 320 joins the anode current collector 212. If the cell enters thermal runaway, one or more of the fuse 220 and the fuse 320 may separate the cathode sheet 116 and the anode sheet 114 respectively. The particular mechanisms by which the fuse 220 and the fuse 320 separate the respective sheets may vary in implementation. For example, in certain embodiments, the fuse 220 and the fuse 320 may dissolve or breakdown, and thus separate the cathode sheet 116 and the anode sheet 114, once the pressure in a cell 112a-e reaches a predefined pressure level.

The fuse 220 and the fuse 320 need not respond to the same thermal runaway condition. In certain embodiments, the fuse 220 and the fuse 320 may not electrically isolate their respective sheets at the same time. For example, the fuse 220 and the fuse 320 may stop conducting at a predefined threshold, such as a threshold temperature or threshold pressure. The fuse 220 may reach the predefined threshold before or after the fuse 320 reaches its predefined temperature threshold. Thus the fuses 220 and 320 may, but need not, operate synchronously.

FIG. 4 shows additional possible configurations of sheets having fuses. While FIG. 4 references a cathode sheet 116 in particular, the configurations are equally applicable to an anode sheet 114.

Figure 4A:
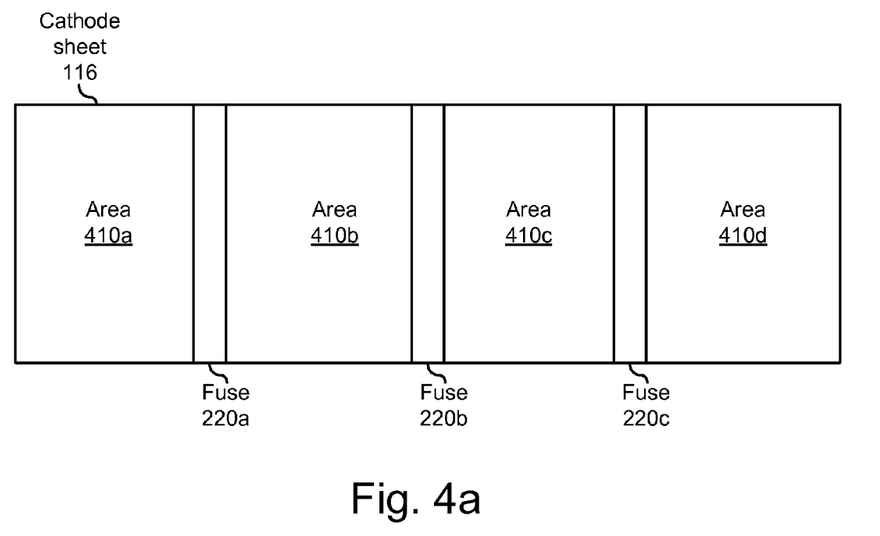

FIG. 4a shows one embodiment of a cathode sheet 116 divided into four separate areas 410a-d by fuses 220a-c. The fuses 220a-c need not be of the same type. Nor do the fuses 220a-c need to be located at a current collector. During thermal runaway, the cathode sheet 116 is divided into separate areas 410a-d. In certain thermal runaway situations the cathode sheet 116 may not be divided into four areas 410a-d during thermal runaway, or may not be divided into the four areas 410a-d simultaneously. For example, a short occurring in the area 410a may result in fuse 220a reaching a predefined threshold temperature at which it stops conducting. The fuse 220a may stop conducting and insulate the remainder of the areas 410b-d before their respective fuses 220b-c reach the predefined threshold temperature and stop conducting current. Thus, the cathode sheet 116 is divided into two separate areas in the above example—the area 410a and the area that includes areas 410b-d.

In one embodiment, the fuses 220a-c are passive fuses that do not require external power sources or devices to activate the fuses 220a-c and cause them to electrically partition the cathode sheet 116. The conditions caused during thermal runaway are sufficient to activate one or more of the fuses 220a-c. For example, a PTC fuse is activated by the rise in heat caused by increased current flow during thermal runaway. In certain embodiments, the fuses 220a-c may be active fuses that incorporate active components, such as sensors, operational amplifiers, or others, to electrically partition the cathode sheet 116 into separate areas 410a-d.

Figure 4B:
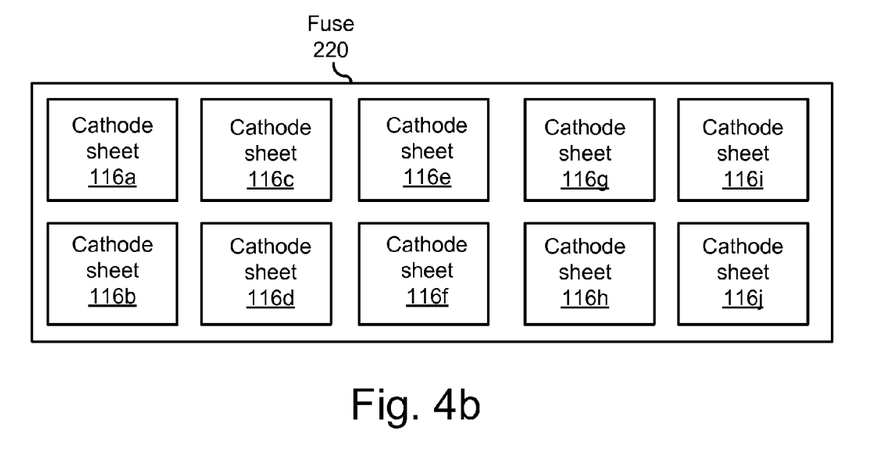

FIG. 4b shows an additional configuration of a cathode sheet 116 incorporating a fuse 220. In the embodiment depicted in FIG. 4b, the fuse 220 is a backing onto which the cathode sheet 116 is laid down. Thus, the cathode sheet 116 is made of various segments 116a-j placed on the fuse 220. When the fuse 220 is conducting current, the segments of the cathode sheet 116a-j act as an electrical whole. However, when thermal runaway occurs, the fuse 220 backing isolates cathode sheet segments 116a-j when the portions of the fuse 220 around the affected sheet or sheets reach the predefined threshold temperature. As a result, the cathode sheet 116 is effectively partitioned and the severity of the thermal runaway is reduced.

Figure 5:
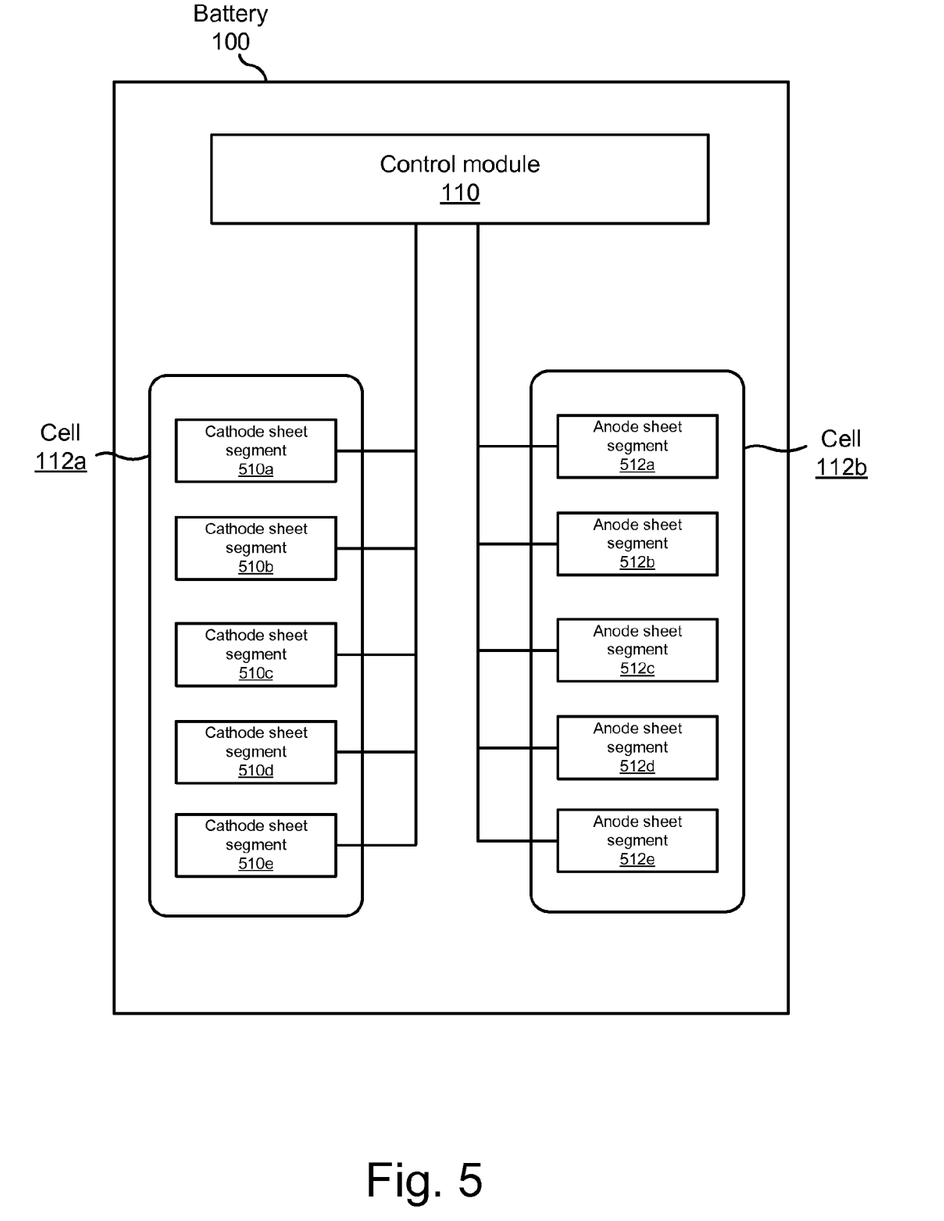
FIG. 5 is a schematic block diagram illustrating one embodiment of a battery having multiple cells that incorporate multiple internal fuses.

FIG. 5 shows one possible embodiment of a battery 100 with a control module 110 and cells 112a-b. The battery 100 may have more or fewer cells 112a-b than shown. The control module 110 includes logic and memory necessary for managing various operations of the battery 100, such as charging and discharging. In addition, the control module 110 may monitor the temperature, voltage, and other parameters of individual cells 112a-b. In the depicted embodiment, the control module 110 also monitors each of the segments in the individual cells 112a-b, such as the cathode sheet segments 510a-e in the cell 112a, and the anode sheet segments 512a-e in the cell 112b. The cells 112a-b may include more or fewer segments than shown, and may also include a mix of cathode sheet segments and anode sheet segments.

In certain embodiments, the control module 110 monitors each of the individual segments in the cells 112a-b. The control module 110 may be configured to shut down operations of the cell 112a if one or more of the cathode sheet segments 510a-e exceed predefined parameters. For example, the control module 110 may stop current flow to or from the cell 112a if a cathode sheet segment 510a-e has a temperature above a predefined temperature for individual cathode sheet segments 510a-e. The control module 110 may also monitor the amount of current passing through the cathode sheet segments 510a-e, the change in current passing through the cathode sheet segments 510a-e, or other relevant parameters. The control module 110 may similarly monitor the anode sheet segments 512a-e in the cell 112b.

Such an embodiment may further reduce the severity of thermal runaway by shutting down the particular cell 112a-b experiencing thermal runaway before the problem increases in scope. In certain embodiments, the control module 110 may also note that the cell 112a is defective and prevent the cell 112a from being used in the future. The control module 110 may also be configured to provide a message alerting a user that the battery 100 requires servicing.

Figure 6A:
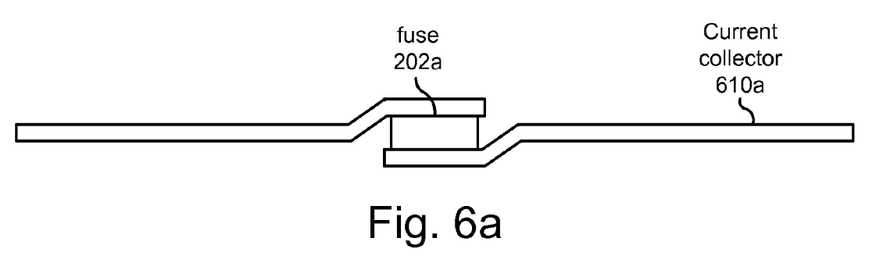
Figure 6B:
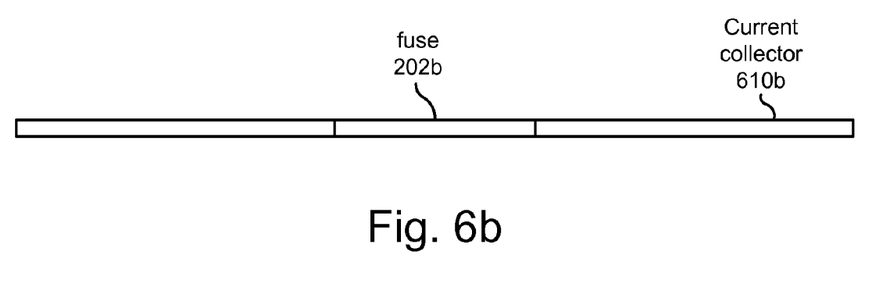

FIG. 6 illustrates exemplary implementations of a fuse placed internally in a cell. FIG. 6a illustrates one embodiment where the fuse 202a is used to join separate pieces of a current collector 610a. The current collector 610a may be an anode current collector or a cathode current collector. The fuse 202a is activated during thermal runaway and stops conducting electricity between the separate portions of the current collector 610a, resulting in a separation of the corresponding anode sheet or cathode sheet. FIG. 6b shows a fuse 202b integrated into the current collector 610b. In certain embodiments, the fuse 202b is physically part of the current collector 610b but chemically distinct; for example, the properties of the current collector 610b may be altered along a strip such that it stops conducting current at a particular temperature. In such an embodiment, the altered strip would act as the fuse 202b.

Figure 6C:
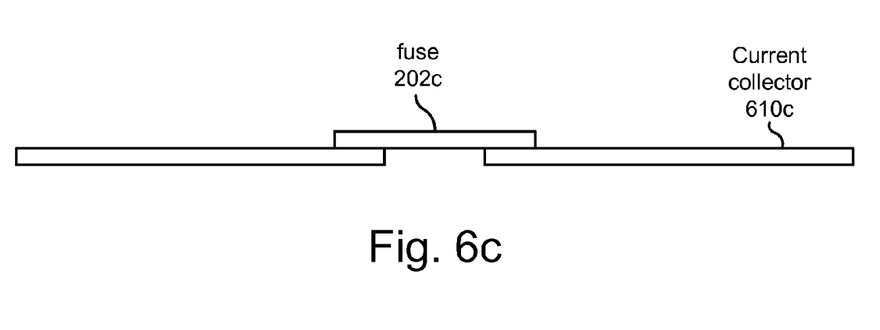

FIG. 6c shows a current collector 610c divided and joined by a fuse 202c. The fuse 202c may be chemical fuse tape that physically joins the two portions of the current collector 610c together and also electrically conducts while the cell having the current collector 610c is within normal operations parameters. Once one or more predefined parameters are outside the bounds of normal operations, the fuse 202c may isolate the two portions of the current collector 610c and thus electrically isolate the corresponding sections of the anode sheet or the cathode sheet.

Figure 7:
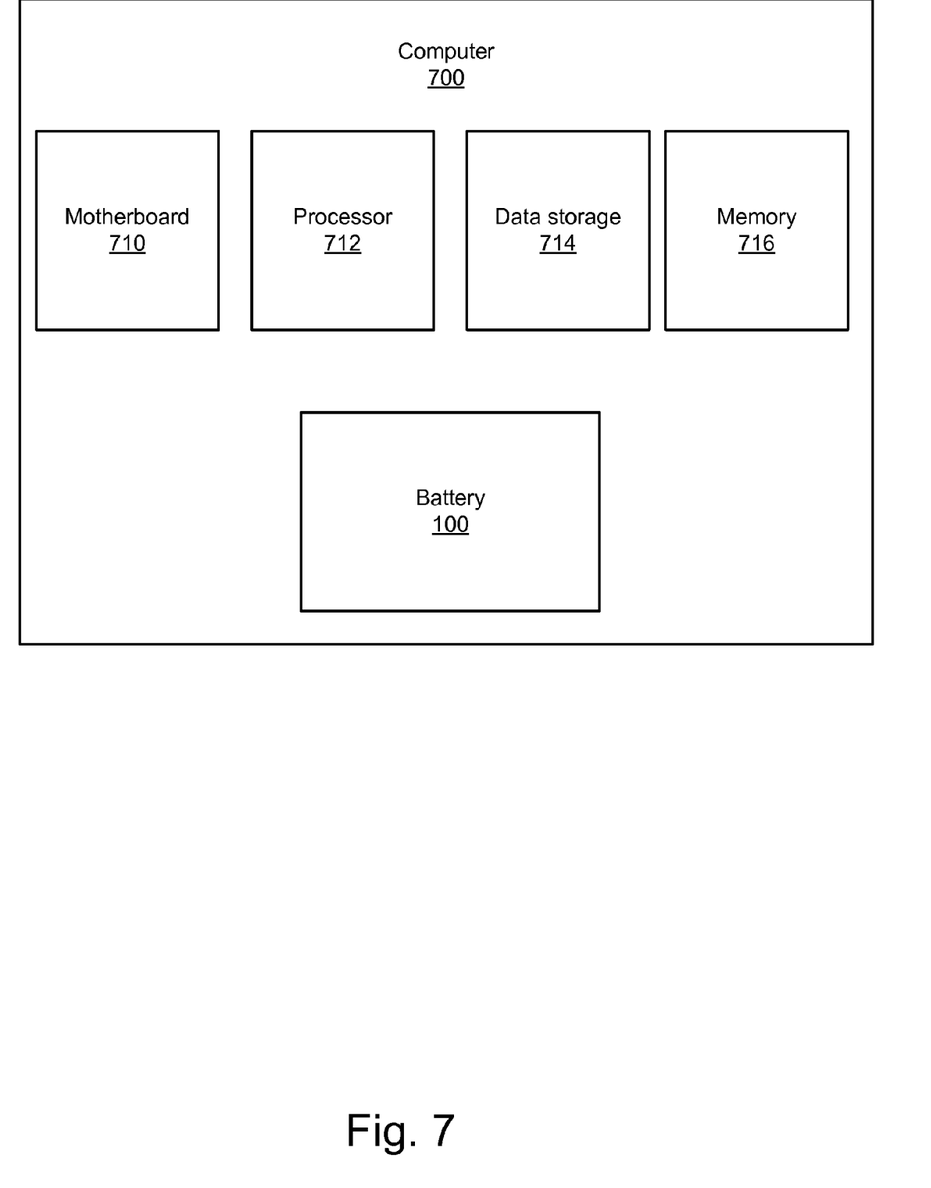
FIG. 7 is an illustrative block diagram of a computer including a battery that battery that incorporates internal fuses.

FIG. 7 illustrates one embodiment of a computer 700 having a battery 100 that includes internal fuses. The computer 700 may be a laptop computer, a desktop computer, a server, or other type of computer. In certain embodiments, the battery 100 is integral to the computer 700; however, the battery 100 may also be external to the computer 700 and electrically connected to the computer 700.

In the depicted embodiment, the computer 700 includes a motherboard 710, a processor 712, data storage 714, and memory 716. The computer 700 may also include additional components that are not shown in FIG. 7. For example, the computer 700 may include peripherals such as a screen and a keyboard, and other components such as graphics cards, speakers, or others.

The motherboard 710 provides a foundation for the computer 700 and connects the various components, such as the processor 712, data storage 714, and memory 716, in a manner that allows the components to communicate. The processor 712 performs the calculations necessary for the computer 700 to function, and generally includes an arithmetic and logic unit, control unit, and registers. The processor 712 communicates with other components, such as the data storage 714 and memory 716, to enable operations.

The data storage 714 allows a user to store information on the computer 700. The data storage 714 may be a hard disk drive, a solid state drive, or other technology for storing information in a computer 700. The memory 716 stores data and supports operations of the processor 712. The memory 716 may be, for example, read-only memory (ROM) or random access memory (RAM). The computer 700 may also include BIOS to handle interactions between software running on the computer 700 and the various hardware components of the computer 700.

The battery 100 provides power to various components of the computer 700, such as the motherboard 710, the processor 712, the data storage 714, and the memory 716. The computer 700 may also contain additional batteries to facilitate operations; for example, a computer may have an additional small battery to help preserve data, power the clock, or perform other functions for the computer 700. The battery 100 may be a rechargeable battery that is charged when connected to a power supply. For example, a laptop computer 700 may include a power supply unit that provides power to the computer 700 from a standard wall socket. The power supply unit may also recharge the battery 100. When the computer 700 is not plugged into a power source by the power supply, the battery 100 provides the necessary power for the computer 700 to operate.

The battery 100 may be a lithium ion battery. As described above, the battery 100 also includes fuses internal to the cells of the battery 100 which reduce the energy available during thermal runaway. As a result, the battery 100 poses less of a threat in the event that a failure in the battery 100, such as a short, causes one or more cells in the battery 100 to enter thermal runaway.

Figure 8:
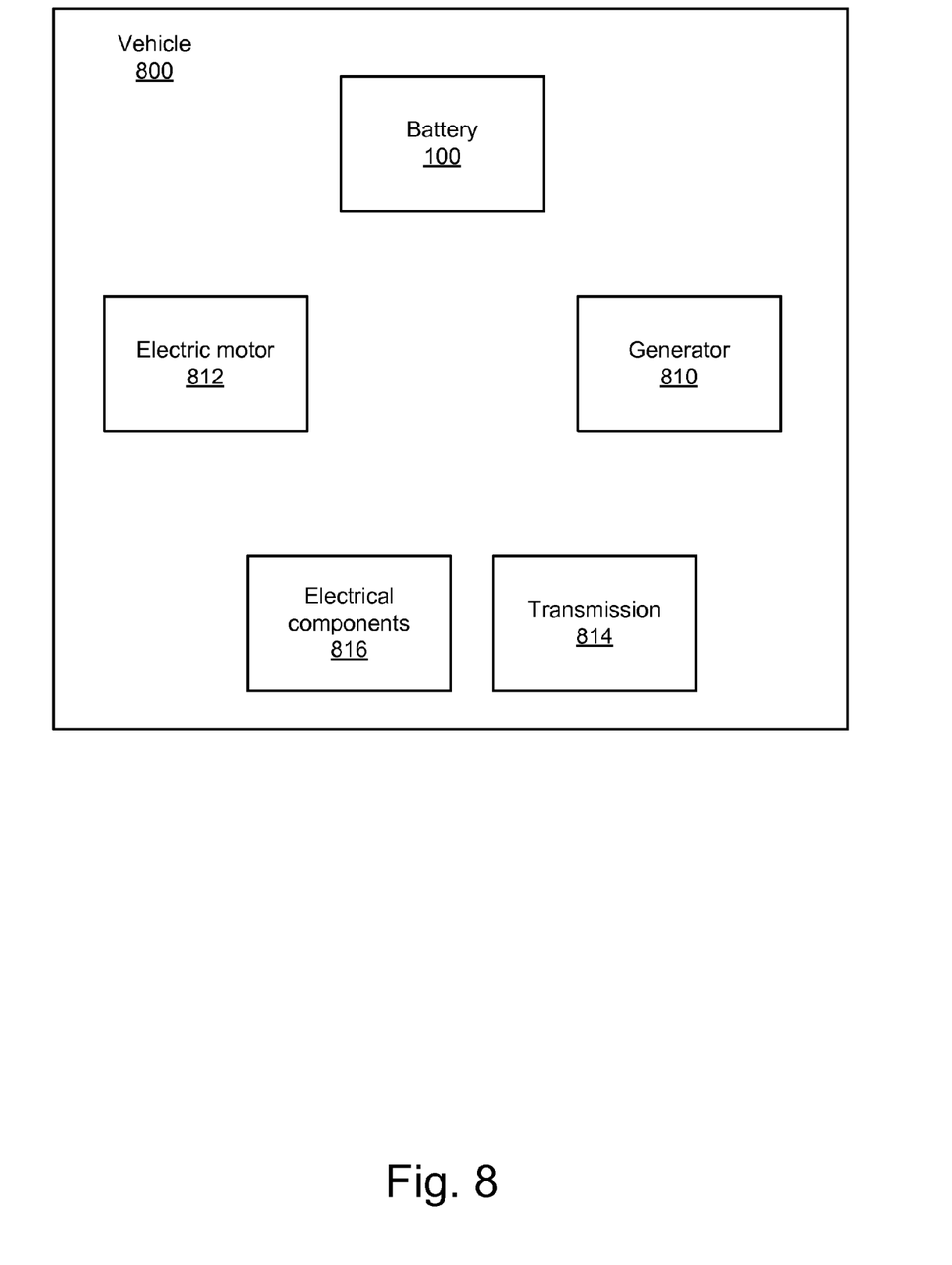
FIG. 8 is an illustrative block diagram of a vehicle that includes a battery that incorporates internal fuses

FIG. 8 is a schematic block diagram illustrates a battery 100 used in a vehicle 800. In FIG. 8, the vehicle 800 is a vehicle that uses an electric motor 812 to aid in providing power. The vehicle 800 may be a pure electric vehicle, or may be a hybrid electric vehicle (HEV). The vehicle 800 may also include a conventional engine, such as a gasoline or diesel engine, to supply power to the transmission 814. The vehicle 800 may be a parallel hybrid that uses the conventional engine in parallel with the electric motor 812 to drive the transmission, which then turns the wheels. The vehicle 800 may also be a series hybrid vehicle 800 that uses the conventional engine to turn the generator 810 and thus provide power to charge the battery 100. In certain embodiments, the generator 810 captures energy during braking and uses that energy to recharge the battery 100. In certain embodiments, the generator 810 is integrated into the electric motor 812.

The battery 100 in the vehicle 800 may be a lithium ion battery, a nickel-metal hydride battery, nickel cadmium battery, or other suitable battery type. The battery 100 provides energy necessary to power the electric motor 812. The battery 100 may also provide power necessary to power the electrical components 816. The electrical components 816 may include onboard computers, lights, stereos, and other components that require electrical energy to operate. In certain embodiments, the vehicle 800 is not a hybrid vehicle, and is instead a standard vehicle 800 using a combustion engine. The battery 100 in such an embodiment simply provides power for the electrical components 816. The vehicle 800 may also be other vehicles that require electrical power such as a boat, motorcycle, airplane, or other.

The battery 100 includes internal fuses that partition the total energy capacity of the battery 100 during thermal runaway. As a result, the use of the battery 100 provides an extra level of security by reducing the danger involved if thermal runaway occurs in the battery 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A battery comprising:
   an anode sheet;
   a cathode sheet;
   a separator situated between the anode sheet and the cathode sheet and electrically separating the anode sheet and the cathode sheet; and
   a fuse and insulating tape that divide at least one of:
      the anode sheet into separate areas electrically connected via the fuse and physically connected via the insulating tape, wherein the fuse is chemically distinct from the anode sheet, wherein the fuse is destroyed after the fuse reaches a temperature between 125 and 150 degrees Celsius and electrically isolates one or more of the separate areas;
      the cathode sheet into separate areas electrically connected via the fuse and physically connected via the insulating tape, wherein the fuse is chemically distinct from the cathode sheet and is destroyed after the fuse reaches a temperature between 125 and 150 degrees Celsius and electrically isolates one or more of the separate areas; and one or more additional fuses that divide one or both of:
the anode sheet into separate areas, the one or more additional fuses being chemically distinct from the one or more separate areas, and electrically isolating the one or more separate areas by dissolving in response to the fuses reaching a predefined threshold pressure level; and the cathode sheet into separate areas, the one or more additional fuses being chemically distinct from the one or more separate areas, and electrically isolating the one or more separate areas by dissolving in response to the fuses reaching a predefined threshold pressure level;

wherein a current collector is coupled between the separate areas of the at least one of the anode sheet and cathode sheet, wherein the fuse is directly coupled to the current collector but is physically separated from direct contact with the separate areas of the at least one of the anode sheet and cathode sheet by the insulating tape;

wherein the fuse conducts electricity at temperatures below the predefined threshold temperature.

2. The battery of claim 1, further comprising a first heat resistant layer coating on the anode sheet and a second heat resistant layer coating on the cathode sheet.

3. The battery of claim 1, wherein the anode sheet, cathode sheet, and the separator are in a jelly roll configuration.

4. The battery of claim 1, further comprising an anode current collector connecting the anode sheet to an anode terminal of the battery and a cathode current collector connecting the cathode sheet to a cathode terminal of the battery.

5. The battery of claim 4, wherein the anode current collector is divided into two and is electrically and physically connected by the fuse such that the anode sheet is divided into two physically separate areas.

6. The battery of claim 4, wherein the cathode current collector is divided into two and is electrically connected by the fuse such that the cathode sheet is divided into two separate areas.

7. The battery of claim 1, wherein the battery is one of a lithium ion battery and a nickel cadmium battery.

8. A battery comprising:
a plurality of battery cells, each battery cell comprising:
an anode sheet;
a cathode sheet;
a separator situated between the anode sheet and the cathode sheet and electrically separating the anode sheet and the cathode sheet; and
a fuse dividing at least one of:
the anode sheet into two separate areas electrically connected by the fuse, wherein the fuse is chemically distinct from the anode sheet, the fuse dissolving after the fuse reaches a predefined threshold pressure level and electrically isolates the two separate areas of the anode sheet in response to the fuse reaching the predefined threshold pressure level;
the cathode sheet into two separate areas electrically connected by the fuse, wherein the fuse is chemically distinct from the cathode sheet, the fuse dissolving after the fuse reaches the predefined threshold pressure level and electrically isolates the two separate areas of the cathode sheet in response to the fuse reaching the predefined threshold pressure level.

9. The battery of claim 8, each of the plurality of battery cells comprising one or more additional fuses.

10. The battery of claim 9, each of the plurality of battery cells comprising:
a first fuse chemically distinct from the anode and physically dividing the anode sheet into two physically separate areas, the first fuse electrically isolating the two separate areas of the anode sheet in response to the first fuse reaching the predefined threshold pressure level; and
a second fuse chemically distinct from the cathode and physically dividing the cathode sheet into two physically separate areas, the second fuse electrically isolating the two separate areas of the cathode sheet in response to the second fuse reaching the predefined threshold temperature.

11. The battery of claim 10, further comprising one or more additional fuses further dividing one or more of the anode sheet and the cathode sheet into additional separate areas.

12. The battery of claim 8, further comprising a first heat resistant layer coating on the anode sheet and a second heat resistant layer coating on the cathode sheet.

13. A lithium ion battery comprising:
a control module that manages the charging and discharging process of the lithium ion battery;
a plurality of lithium ion battery cells, each battery cell comprising:
an anode sheet;
a cathode sheet;
an anode current collector electrically connecting the anode sheet to an anode terminal of the lithium ion battery, wherein the anode current collector comprises two pieces;
a cathode current collector electrically connecting the cathode sheet to a cathode terminal of the lithium ion battery, wherein the cathode current collector comprises two pieces;
a separator situated between the anode sheet and the cathode sheet and electrically separating the anode sheet and the cathode sheet while allowing ions to pass between the anode sheet and the cathode sheet; and
a first fuse electrically joining and a first insulating tape physically joining a first piece of the anode current collector with a second piece of the anode current collector, wherein the first fuse is chemically distinct from the anode sheet, wherein the first fuse is destroyed and stops current from passing through the first fuse in response to the first fuse reaching a temperature of between 125° C. and 150° C.; and
a second fuse electrically joining and a second insulating tape physically joining a first piece of the cathode current collector with a second piece of the cathode current collector, wherein the second fuse is chemically distinct from the cathode sheet, wherein the second fuse is destroyed and stops current from passing through the second fuse in response to the second fuse reaching a temperature of between 125° C. and 150° C.;
wherein the first and the second fuse dissolve in response to the fuses reaching a predefined threshold pressure level.

14. The lithium ion battery of claim 13, wherein the first fuse is directly coupled between the first and second pieces of the anode current collector but is physically separated from direct contact with the anode sheet by the first insulating tape, wherein the second fuse is directly coupled between the first and second pieces of the cathode current collector but is physically separated from direct contact with the cathode sheet by the second insulating tape.

* * * * *